US012651697B2

(12) United States Patent
Tachibana

(10) Patent No.: US 12,651,697 B2
(45) Date of Patent: Jun. 9, 2026

(54) ELECTRONIC COMPONENT

(71) Applicant: Murata Manufacturing Co., Ltd., Nagaokakyo (JP)

(72) Inventor: Shinya Tachibana, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 170 days.

(21) Appl. No.: 18/740,570

(22) Filed: Jun. 12, 2024

(65) Prior Publication Data

US 2024/0331935 A1      Oct. 3, 2024

Related U.S. Application Data

(63) Continuation of application No. PCT/JP2023/002074, filed on Jan. 24, 2023.

(30) Foreign Application Priority Data

Feb. 4, 2022      (JP) ................................. 2022-016416

(51) Int. Cl.
| | |
|---|---|
| *H01H 9/00* | (2006.01) |
| *H01F 27/28* | (2006.01) |
| (Continued) | |

(52) U.S. Cl.
CPC ......... *H01F 27/40* (2013.01); *H01F 27/2804* (2013.01); *H01F 27/292* (2013.01); (Continued)

(58) Field of Classification Search
CPC ....................................................... H01F 27/40
See application file for complete search history.

(56) References Cited

U.S. PATENT DOCUMENTS

| | | | |
|---|---|---|---|
| 10,650,958 B2 * | 5/2020 | Jo | ......................... H01F 27/292 |
| 2011/0140806 A1 | 6/2011 | Taniguchi | |
| | (Continued) | | |

FOREIGN PATENT DOCUMENTS

| | | |
|---|---|---|
| JP | H0339824 U | 4/1991 |
| JP | H05308023 A | 11/1993 |
| | (Continued) | |

OTHER PUBLICATIONS

International Search Report in PCT/JP2023/002074, mailed Apr. 18, 2023, 3 pages.

(Continued)

*Primary Examiner* — Stephen W Jackson
(74) *Attorney, Agent, or Firm* — Keating & Bennett, LLP

(57)      ABSTRACT

A filter device includes an insulator, an inductor, a capacitor, and first and second outer electrodes. In plan view from one major surface, the capacitor overlaps a portion of a conductor pattern in the insulator. The second outer electrode is electrically coupled to the capacitor. The second outer electrode includes side portions on specific opposite side surfaces of the insulator. The capacitor includes a first electrode pattern electrically coupled to the inductor, and a second electrode pattern electrically coupled to the side portions of the second outer electrode with at least one wiring pattern that extends parallel or parallel or substantially parallel to a portion of the conductor pattern.

17 Claims, 14 Drawing Sheets

(51) Int. Cl.

| | |
|---|---|
| *H01F 27/29* | (2006.01) |
| *H01F 27/32* | (2006.01) |
| *H01F 27/40* | (2006.01) |
| *H01G 17/00* | (2006.01) |

(52) U.S. Cl.

CPC ........... *H01F 27/323* (2013.01); *H01G 17/00*
(2013.01); *H01F 2027/2809* (2013.01)

(56) References Cited

U.S. PATENT DOCUMENTS

| | | | |
|---|---|---|---|
| 2013/0009726 A1 | 1/2013 | Sasaki | |
| 2015/0116056 A1 | 4/2015 | Masuda | |
| 2016/0233845 A1 | 8/2016 | Masuda et al. | |
| 2018/0211768 A1* | 7/2018 | Ishizuka | .................. H03H 1/00 |
| 2018/0351526 A1* | 12/2018 | Miyoshi | .................. H01F 27/29 |
| 2020/0119708 A1 | 4/2020 | Shiokawa | |
| 2023/0309229 A1* | 9/2023 | Oohashi | ................. H05K 1/111 |
| 2023/0352227 A1* | 11/2023 | Hiei | ......................... H01G 4/40 |
| 2023/0395312 A1* | 12/2023 | Yoshioka | ............ H01F 17/0006 |
| 2024/0235516 A1* | 7/2024 | Tachibana | ............ H03H 7/0115 |
| 2024/0412907 A1* | 12/2024 | Ozawa | ................... H01F 17/04 |

FOREIGN PATENT DOCUMENTS

| | | |
|---|---|---|
| JP | 2010187315 A | 8/2010 |
| JP | 2010287746 A | 12/2010 |
| JP | 2011124880 A | 6/2011 |
| JP | 2013021449 A | 1/2013 |
| JP | 2015111799 A | 6/2015 |
| WO | 2005036741 A1 | 4/2005 |
| WO | 2015064133 A1 | 5/2015 |
| WO | 2019003723 A1 | 1/2019 |

OTHER PUBLICATIONS

Written Opinion in PCT/JP2023/002074, mailed Apr. 18, 2023, 3 pages.

\* cited by examiner

FIG.10

ELECTRONIC COMPONENT

CROSS REFERENCE TO RELATED APPLICATIONS

This application claims the benefit of priority to Japanese Patent Application No. 2022-016416 filed on Feb. 4, 2022 and is a Continuation Applications of PCT Application No. PCT/JP2023/002074 filed on Jan. 24, 2023. The entire contents of each application are hereby incorporated herein by reference.

BACKGROUND OF THE INVENTION

1. Field of the Invention

The present disclosure relates to electronic components.

2. Description of the Related Art

Some electronic components, known as filter devices, integrate inductors (coils) and capacitors within an insulator composed of multiple stacked insulator layers. As an example of these filter devices, Japanese Unexamined Patent Application Publication No. 2013-21449 describes a filter device that incorporates an inductor and a capacitor within an insulator having an outer electrode. In this filter device, when the insulator is viewed in plan view from the top surface, the inductor is stacked above the capacitor.

SUMMARY OF THE INVENTION

When the filter device is implemented as a small component, extending the conductor pattern of the inductor to the outer frame of the insulator to the maximum possible extent is necessary to achieve the design inductance. As a result, the outer electrode is provided on a side surface of the insulator, and the outer electrode on the side surface is connected with the inductor pattern and the capacitor pattern by wiring patterns. With this configuration, parasitic inductance (equivalent series inductance (ESL)) can be generated in the wiring patterns connecting the capacitor to the outer electrode. Consequently, the filter characteristics of this filter device may deteriorate below the design values due to the resulting parasitic inductance.

Example embodiments of the present invention provide electronic components that reduce or minimize an influence of parasitic inductance.

An electronic component according to an example embodiment of the present disclosure includes an insulator, a first inductor, a capacitor, a first outer electrode, and a second outer electrode. The insulator includes a pair of opposite major surfaces. The insulator includes side surfaces that connect the major surfaces. The first inductor includes at least one first conductor pattern within the insulator. The capacitor is provided at a location that overlaps a portion of the first conductor pattern in the insulator when viewed in plan view from one surface of the major surfaces. The first outer electrode is electrically coupled to the first inductor. The second outer electrode is electrically coupled to the capacitor. The second outer electrode includes side portions provided on specific opposite side surfaces among the side surfaces of the insulator. The capacitor includes a first electrode pattern electrically coupled to the first inductor and a second electrode pattern electrically coupled to the side portions of the second outer electrode with at least one wiring pattern. The at least one wiring pattern is parallel or parallel or substantially parallel to a portion of the first conductor pattern.

According to an example embodiment of the present disclosure, a capacitor is provided at a location that overlaps a portion of the first conductor pattern in the insulator, and the second electrode pattern of the capacitor is electrically coupled to the side portions of the second outer electrode with the at least one wiring pattern. This configuration reduces or minimizes the influence of parasitic inductance.

The above and other elements, features, steps, characteristics and advantages of the present invention will become more apparent from the following detailed description of the example embodiments with reference to the attached drawings.

BRIEF DESCRIPTION OF THE DRAWINGS

FIG. 10 is an exploded plan view of a configuration of the filter device according to the second example embodiment of the present invention.

DETAILED DESCRIPTION OF THE EXAMPLE EMBODIMENTS

Figure 1:
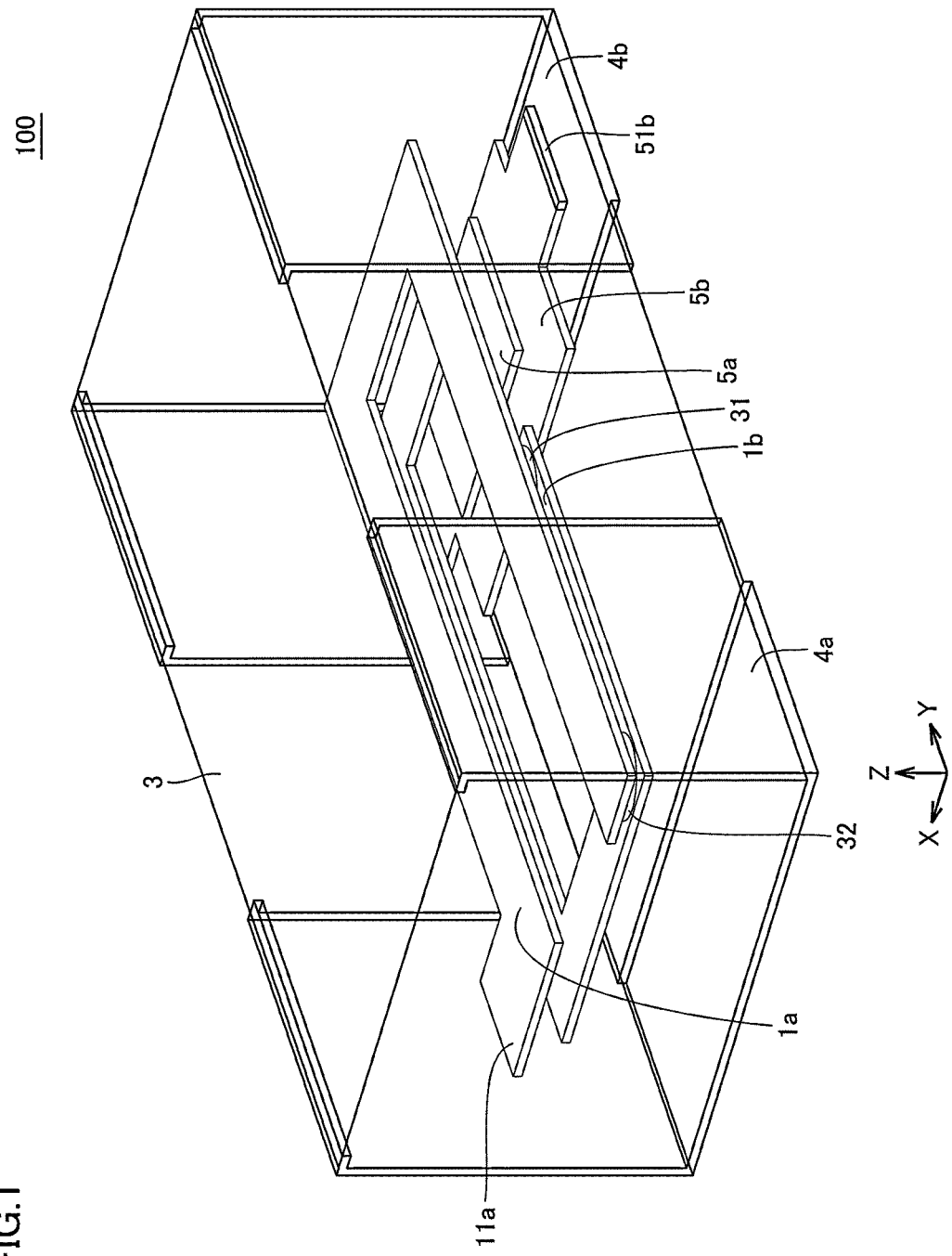
FIG. 1 is a perspective view of a filter device according to a first example embodiment of the present invention.

Hereinafter, filter devices will be specifically described as examples of electronic components according to some example embodiments with reference to the drawings. In the drawings, identical or equivalent elements or features are denoted by the same reference numerals, and descriptions thereof will not be reiterated. The electronic components according to some example embodiments are not limited to filter devices.

First Example Embodiment

Architecture of Filter Device

First, a filter device according to a first example embodiment will be described with reference to the drawings. FIG. 1 is a perspective view of a filter device 100 according to the first example embodiment. In FIG. 1, the short-edge direction of the filter device 100 corresponds to the X direction, the long-edge direction to the Y direction, and the height direction to the Z direction.

The filter device 100 is a rectangular or substantially rectangular parallelepiped chip component that includes one inductor and one capacitor stacked in the Z direction. The filter device 100 includes an insulator r 3 including multiple stacked insulating substrates (insulator layers) including the conductor patterns of an inductor L and the electrode patterns of a capacitor C, as illustrated in FIG. 1. The stacking direction of the insulating substrates corresponds to the Z direction, and the arrow of the Z direction indicates the direction towards the upper layers. The insulating substrates are made from, for example, silicate glass-based insulating materials or insulating resins including alumina, zirconia, or polyimide resin. In the insulator 3, the interfaces between the multiple insulating substrates may be indistinct due to treatments such as firing or solidifying.

In the filter device 100, an outer electrode 4a (first outer electrode) and an outer electrode 4b (second outer electrode) are provided at two locations in the Y direction in the insulator 3 as illustrated in FIG. 1. The insulator 3 includes a pair of opposite major surfaces. The major surface on the lower side in FIG. 1 serves as a mounting surface, which is designed to face a circuit board. In the first example embodiment, the major surface on the lower side in FIG. 1 is also referred to as the bottom surface, and the major surface on the upper side in FIG. 1 is also referred to as the top surface.

The outer electrodes 4a and 4b are defined by electrode patterns on the bottom surface of the insulator 3 and electrode patterns on specific side surfaces connecting the major surfaces of the insulator 3. When the insulator 3 is viewed from a side surface (XZ plane) along a short edge of the insulator 3, the outer electrodes 4a and 4b are U-shaped. The side portions of the outer electrodes 4a, provided on specific opposite side surfaces of the insulator 3, can have the same potential, owing to the electrode pattern provided on the bottom surface of the insulator 3. Similarly, the side portions of the outer electrodes 4b, provided on specific opposite side surfaces of the insulator 3, can have the same potential, owing to the electrode pattern provided on the bottom surface of the insulator 3.

The foregoing explained that both the outer electrodes 4a and 4b include electrode patterns on specific opposite side surfaces of the insulator 3. However, when at least the outer electrode 4b includes electrode patterns on specific opposite side surfaces of the insulator 3, the outer electrode 4a does not necessarily include electrode patterns on both the specific opposite side surfaces of the insulator 3. In this case, the outer electrode 4a may be provided on side surfaces along short edges, which is different from the surfaces including the outer electrode 4b.

A conductor pattern 1a (first conductor pattern) of the inductor L and the outer electrode 4a are electrically coupled at a side surface of the insulator 3 via a wiring pattern 11a. An electrode pattern 5b (second electrode pattern) of the capacitor C and the outer electrode 4b are electrically coupled at specific side surfaces of the insulator 3 via a wiring pattern 51a (see FIG. 3) and a wiring pattern 51b.

The inductor L includes conductor patterns 1a and 1b stacked parallel or substantially parallel to the major surfaces of the insulator 3. The conductor patterns 1a and 1b are electrically coupled via interconnections such as via-conductors 31 and 32. The capacitor C includes electrode patterns 5a and 5b stacked across layers under the inductor L, with an insulating layer interposed between the electrode patterns 5a and 5b. When viewed in plan view from one surface (top surface) of the major surfaces, the capacitor C is provided at a location that overlaps a portion of the conductor patterns 1a and 1b in the insulator 3. The inductor L and the capacitor C are coupled in series in the insulator 3 to define an LC series circuit.

Figure 2:
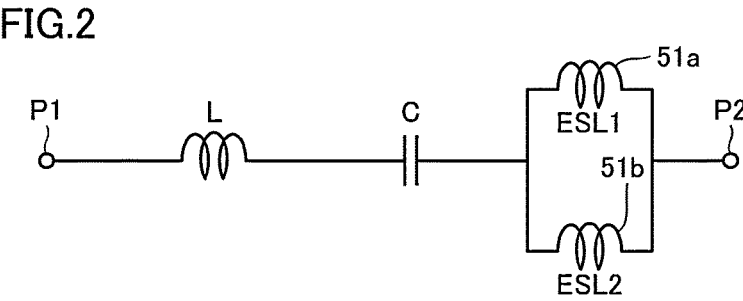
FIG. 2 is a circuit diagram of the filter device according to the first example embodiment of the present invention.

FIG. 2 is a circuit diagram of the filter device 100 according to the first example embodiment. The filter device 100 includes a first terminal P1, the inductor L coupled to the first terminal P1, the capacitor C coupled in series with the inductor L, and a second terminal P2 coupled to the capacitor C. The first terminal P1 corresponds to the outer electrode 4a illustrated in FIG. 1, and the second terminal P2 corresponds to the outer electrode 4b illustrated in FIG. 1.

In the circuit diagram of the filter device 100 illustrated in FIG. 2, parasitic inductances ESL1 and ESL2 are illustrated between the capacitor C and the second terminal P2. The parasitic inductances ESL1 and ESL2 can be generated in the wiring patterns 51a and 51b that connect the electrode pattern 5b of the capacitor C and the outer electrodes 4b.

Exploded Plan View of Filter Device

Figure 3:
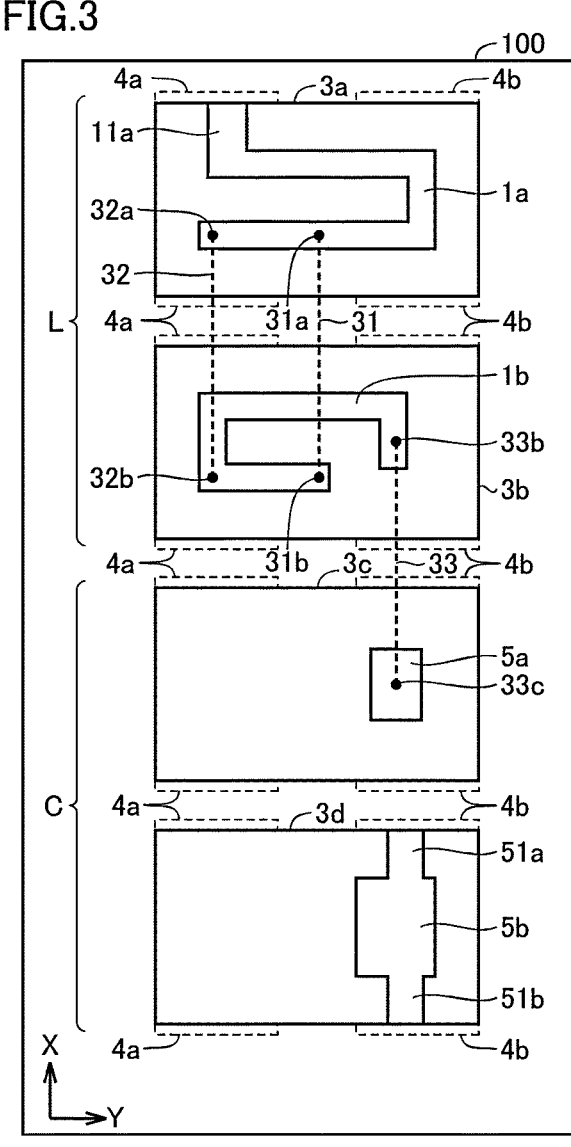
FIG. 3 is an exploded plan view of a configuration of the filter device according to the first example embodiment of the present invention.

Next, the configuration of each layer will be described using an exploded plan view. FIG. 3 is an exploded plan view of a configuration of the filter device 100 according to the first example embodiment. First, as illustrated in FIG. 3, the conductor patterns 1a and 1b, the wiring patterns 11a, 51a, and 51b, and the electrode patterns 5a and 5b are formed by printing on insulating substrates 3a to 3d.

The conductor pattern 1a, which defines a portion of the inductor L, is provided on the insulating substrate 3a. The conductor pattern 1a is shaped into an approximately ¾ clockwise turn starting from the upper left side of the insulating substrate 3a in the drawing. The starting end of the conductor pattern 1a is electrically coupled to the outer electrode 4a via the wiring pattern 11a. Near the terminating end of the conductor pattern 1a, connection portions 31a and 32a are provided. The connection portion 31a is coupled to the via-conductor 31, and the connection portion 32a is coupled to the via-conductor 32.

The conductor pattern 1b, which defines a portion of the inductor L, is provided on the insulating substrate 3b. The conductor pattern 1b is shaped into an approximately ¾ clockwise turn starting from the lower side of the insulating substrate 3b in the drawing. Near the starting end of the conductor pattern 1b, connection portions 31b and 32b are provided. The connection portion 31b is coupled to the via-conductor 31, and the connection portion 32b is coupled to the via-conductor 32. Near the terminating end of the conductor pattern 1b, a connection portion 33b is provided. The connection portion 33b is coupled to the via-conductor 33. The inductor L defines an approximately 1.5-turn coil, with the conductor patterns 1a and 1b coupled in series.

The electrode pattern 5a (first electrode pattern), which defines one electrode of the capacitor C, is provided on the insulating substrate 3c. When viewed in plan view from the top surface, the electrode pattern 5a is provided at a location that overlaps a portion of the conductor patterns 1a and 1b in the insulator 3. In other words, the electrode pattern 5a is positioned to reduce or minimize overlap with the opening portion of the inductor L, which includes the conductor patterns 1a and 1b. The electrode pattern 5a includes a connection portion 33c that is coupled to the via-conductor 33.

The electrode pattern 5b, which defines the other electrode of the capacitor C, is provided on the insulating substrate 3d. When viewed in plan view from the top surface, the electrode pattern 5b is provided at a location that faces the electrode pattern 5a in the insulator 3. The electrode pattern 5b is electrically coupled to the outer electrode 4b via the wiring patterns 51a and 51b. Although the wiring patterns 51a and 51b are each illustrated as a single wire, the wiring patterns 51a and 51b may each include multiple wires.

The outer electrode 4b is provided on specific opposite side surfaces of the insulator 3 as illustrated in FIG. 1. The wiring patterns 51a and 51b electrically couple the respective side portions of the outer electrode 4b to the electrode pattern 5b. Since the side portions of the outer electrode 4b can have the same potential, the wiring patterns 51a and 51b are coupled in parallel between the second terminal P2 (the outer electrode 4b) and the capacitor C (the electrode pattern 5b) as illustrated in the circuit diagram in FIG. 2. Consequently, the parasitic inductances ESL1 and ESL2, generated by the wiring patterns 51a and 51b, are parallel or substantially parallel to each other, which actually decreases the parasitic inductance.

When viewed from the top surface in plan view, the portion overlapping the capacitor C of the conductor pattern 1b partially extends parallel or substantially parallel to one specific edge (short edge) of the insulator 3. Near the one specific edge, the side portions of the outer electrode 4b face each other. In FIG. 3, the portion extending in the X direction on the right side in the drawing of the conductor pattern 1b is parallel or substantially parallel to the one specific edge (short edge) of the insulator 3. As such, the conductor pattern 1b includes a portion that extends in the same direction as the direction of the wiring patterns 51a and 51b. With this configuration, the wiring patterns 51a and 51b and the conductor pattern 1b can be coupled to each other in both the strengthening and weakening directions. This configuration thus facilitates control of filter characteristics of the filter device 100. The wiring patterns 51a and 51b may be coupled to the conductor pattern 1a as well as the conductor pattern 1b. When the positional relationship between the conductor pattern 1b and the wiring patterns 51a and 51b prevents coupling, the wiring patterns 51a and 51b may be coupled exclusively to the conductor pattern 1a.

The electrode patterns 5a and 5b are positioned to reduce or minimize overlap with the opening portion of the inductor L, which includes the conductor patterns 1a and 1b. This configuration does not disturb the magnetic field generated by the inductor L while allowing the filter device 100 to be implemented as a small component.

The wiring patterns 51a and 51b are drawn from two ends of the electrode patterns 5b as illustrated in FIG. 3 to connect with the side portions of the outer electrode 4b, provided on specific opposite side surfaces of the insulator 3. When the insulating substrates are stacked with a misalignment (stacking misalignment) that displaces the wiring patterns 51a and 51b in the short-edge direction of the insulator 3, this configuration reduces or minimizes the variation in parasitic inductance. As such, this configuration reduces or minimizes variations in the filter device characteristics.

Figure 4:
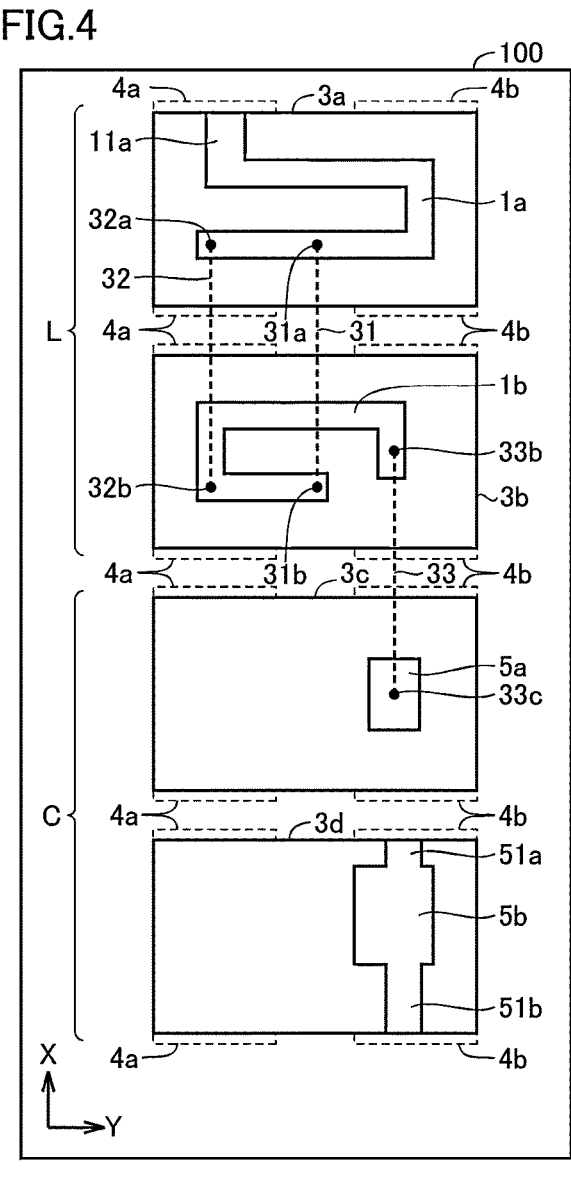
FIG. 4 is an exploded plan view of the configuration of the filter device according to the first example embodiment of the present invention when stacking misalignment occurs in one direction.
Figure 5:
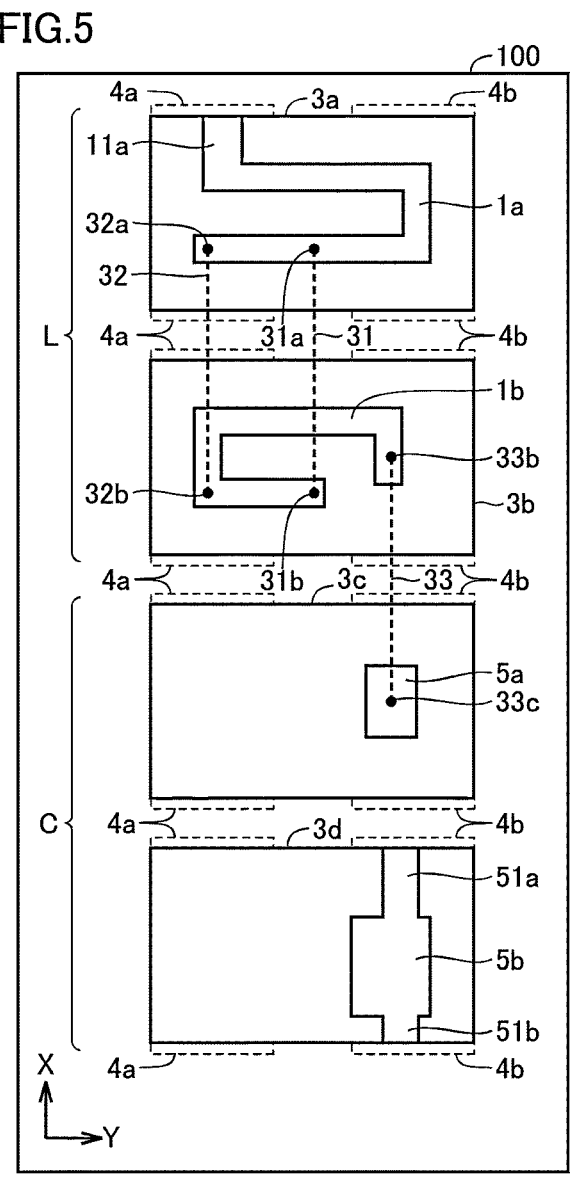
FIG. 5 is an exploded plan view of the configuration of the filter device according to the first example embodiment of the present invention when stacking misalignment occurs in another direction.

The following describes details with reference to the drawings. FIG. 4 is an exploded plan view of the configuration of the filter device 100 according to the first example embodiment when stacking misalignment occurs in one direction. FIG. 5 is an exploded plan view of the configuration of the filter device 100 according to the first example embodiment when stacking misalignment occurs in another direction. FIGS. 4 and 5 are identical to the exploded plan view illustrated in FIG. 3, with the exception that the electrode pattern 5b on the insulating substrate 3d is displaced. Thus, identical configuration elements are denoted by the same reference numerals, and detailed descriptions thereof are not repeated.

In the filter device 100 illustrated in FIG. 4, the electrode pattern 5b on the insulating substrate 3d is displaced in the positive direction (the direction of the arrow) along the X-axis. As a result, the outer electrode 4b on the upper side in the drawing is positioned closer to the electrode pattern 5b, and the length of the wiring pattern 51a is relatively short. As a result, the outer electrode 4b on the lower side in the drawing is positioned farther from the electrode pattern 5b, and the length of the wiring pattern 51b is relatively long.

In the filter device 100 illustrated in FIG. 5, the electrode pattern 5b on the insulating substrate 3d is displaced in the negative direction (the direction opposite the arrow) along the X-axis. As a result, the outer electrode 4b on the lower side in the drawing is positioned closer to the electrode pattern 5b, and the length of the wiring pattern 51b is relatively short. Conversely, the outer electrode 4b on the upper side in the drawing is positioned farther from the electrode pattern 5b, and the length of the wiring pattern 51a is relatively long.

In an example, the parasitic inductance ESL1 generated in the wiring pattern 51a is about 0.10 nH, the parasitic inductance ESL2 generated in the wiring pattern 51b is about 0.15 nH, and the total of these parallel-coupled parasitic inductances ESL1 and ESL2 is about 0.06 nH, for example. In this example, when the increase or decrease in parasitic inductance due to stacking misalignment is, for example, about ±0.05 nH, the parasitic inductance ESL1 becomes about 0.05 nH, and the parasitic inductance ESL2 becomes about 0.20 nH in the filter device 100 illustrated in FIG. 4, for example. Consequently, the total of these parallel-coupled parasitic inductances ESL1 and ESL2 is about 0.04 nH, for example.

In the filter device 100 illustrated in FIG. 5, the parasitic inductance ESL1 becomes about 0.15 nH, and the parasitic inductance ESL2 becomes about 0.10 nH, for example. Consequently, the total of these parallel-coupled parasitic inductances ESL1 and ESL2 is about 0.06 nH, for example. This means that when the increase or decrease of parasitic inductance due to stacking misalignment is about +0.05 nH, the total of the parallel-coupled parasitic inductances ESL1 and ESL2 in the filter device 100 varies between about 0.04 nH and about 0.06 nH, for example.

By contrast, when the wiring pattern 51a is not provided, and the outer electrode 4b and the electrode pattern 5b are electrically coupled only by the wiring pattern 51b, the parasitic inductance ESL2 varies between about 0.10 nH and about 0.20 nH, for example. Overall, the filter device 100 reduces the variation in parasitic inductance due to stacking misalignment caused by the processing variations, by coupling the wiring patterns 51*a* and 51*b* in parallel.

Figure 6:
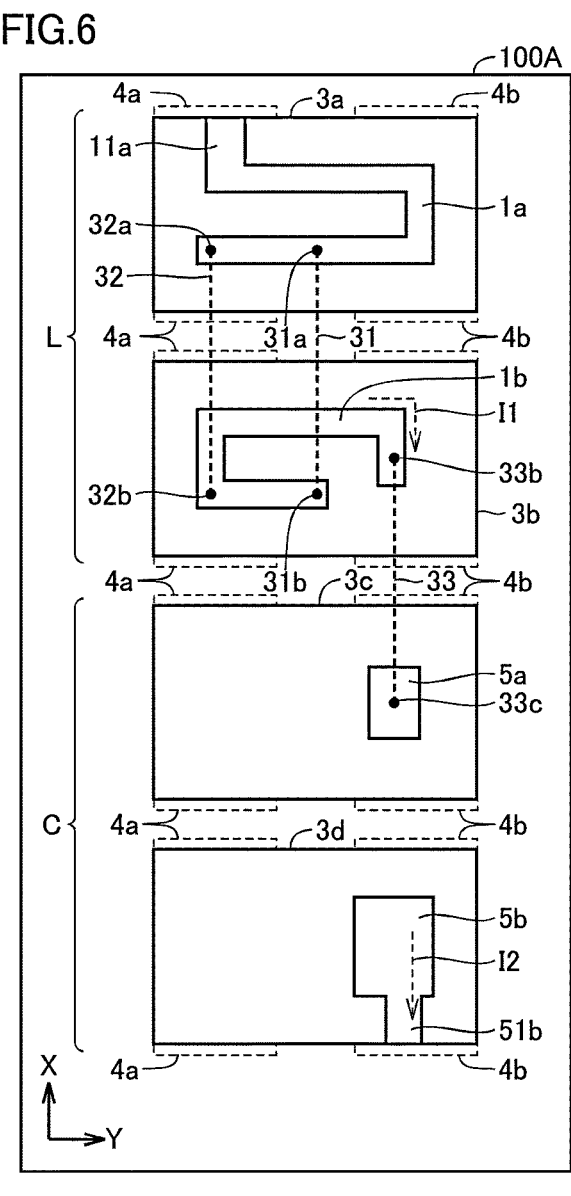
FIG. 6 is an exploded plan view of a configuration of a modification of the filter device according to the first example embodiment of the present invention.

Next, a filter device designed to control inductance with a wiring pattern drawn from one end of the electrode pattern 5*b* of the capacitor will be described. FIG. 6 is an exploded plan view of a configuration of a modification of the filter device according to the first example embodiment. A filter device 100A illustrated in FIG. 6 is configured such that the wiring pattern 51*a* is not provided, and the outer electrode 4*b* and the electrode pattern 5*b* are electrically coupled only by the wiring pattern 51*b*. FIG. 6 is identical to the exploded plan view illustrated in FIG. 3, with the exception that the wiring pattern 51*a* is not provided on the insulating substrate 3*d*. Thus, identical configuration elements are denoted by the same reference numerals, and detailed descriptions thereof are not repeated.

Given that a current I1 flows toward the connection portion 33*b* in the conductor pattern 1*b* on the insulating substrate 3*b*, a current I2 that is parallel or substantially parallel to the current I1 and travels in the same direction as the current I1 flows in the wiring pattern 51*b* on the insulating substrate 3*d*. Since the filter device 100A illustrated in FIG. 6 has the wiring pattern 51*b* in which current can flow in the same direction as the current in the conductor pattern 1*b*, the filter device 100A does not impede the self-induction of the inductor L, thus increasing the total reactance.

Figure 7:
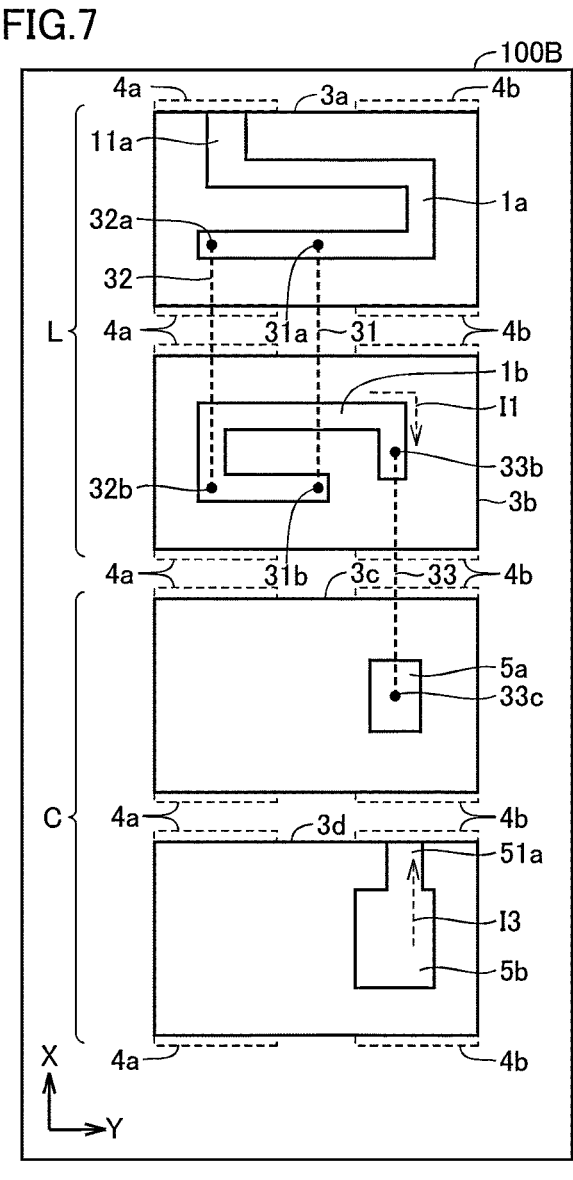
FIG. 7 is an exploded plan view of a configuration of another modification of the filter device according to the first example embodiment of the present invention.

FIG. 7 is an exploded plan view of a configuration of another modification of the filter device according to the first example embodiment. A filter device 100B illustrated in FIG. 7 is configured such that the wiring pattern 51*b* is not provided, and the outer electrode 4*b* and the electrode pattern 5*b* are electrically coupled only by the wiring pattern 51*a*. FIG. 7 is identical to the exploded plan view illustrated in FIG. 3, with the exception that the wiring pattern 51*b* is not provided on the insulating substrate 3*d*. Thus, identical configuration elements are denoted by the same reference numerals, and detailed descriptions thereof are not repeated.

Given that a current I1 flows toward the connection portion 33*b* in the conductor pattern 1*b* on the insulating substrate 3*b*, a current I3 that is parallel or substantially parallel to the current I1 and travels in the opposite direction to the current I1 flows in the wiring pattern 51*a* on the insulating substrate 3*d*. Since the filter device 100B illustrated in FIG. 7 has the wiring pattern 51*a* in which current can flow in the opposite direction to the current in the conductor pattern 1*b*, the filter device 100B impedes the self-induction of the inductor L, thereby decreasing the total reactance.

As described with the filter device 100A illustrated in FIG. 6 and the filter device 100B illustrated in FIG. 7, the inductance of the inductor L can also be controlled by using either one of the wiring patterns 51*a* and 51*b* to electrically couple the outer electrode 4*b* and the electrode pattern 5*b*, instead of using the two wiring patterns 51*a* and 51*b*.

As described above, the filter device 100 according to the first example embodiment includes the insulator 3, the inductor L, the capacitor C, and the outer electrodes 4*a* and 4*b*. The insulator 3 includes a pair of opposite major surfaces, and side surfaces that connect the major surfaces. The inductor L includes at least one conductor pattern 1*a*, 1*b* within the insulator 3. When viewed in plan view from one surface of the major surfaces, the capacitor C is provided at a location that overlaps a portion of the conductor pattern 1*a*, 1*b* in the insulator 3. The outer electrode 4*a* is electrically coupled to the inductor L. The outer electrode 4*b* is electrically coupled to the capacitor C. The outer electrode 4*b* includes side portions provided on specific opposite side surfaces of the insulator 3. The capacitor C includes the electrode pattern 5*a* electrically coupled to the inductor L, and the electrode pattern 5*b* electrically coupled to the side portions of the outer electrode 4*b* with at least one wiring pattern 51*a*, 51*b*. The at least one wiring pattern 51*a*, 51*b* extends parallel or substantially parallel to a portion of the conductor pattern 1*a*, 1*b*.

With this configuration, in the filter device 100 according to the first example embodiment, the electrode pattern 5*b* of the capacitor C is electrically coupled to the side portions of the outer electrode 4*b* with the at least one wiring pattern 51*a*, 51*b*. This configuration reduces the influence of parasitic inductance generated in the filter device 100.

When the filter device is implemented as a small component, extending the conductor pattern of the inductor to the outer frame of the insulator to the maximum possible extent is necessary to achieve the design inductance. As a result, layering the inductor above the capacitor is needed. However, in the case where the conductor pattern of the inductor is extended to the outer frame of the insulator to the maximum possible extent, when the insulator is observed in plan view from the top surface, eddy currents can be generated in the electrode of the capacitor due to certain shapes of the capacitor and specific positional relationships with the inductor. This may result in insufficient Q factors. In this regard, in the filter device 100, the inductor L and the capacitor C overlap at only a portion of the conductor patterns 1*a* and 1*b* of the inductor L. This configuration prevents the generation of eddy currents in the electrode patterns 5*a* and 5*b*, thereby mitigating the decrease in the Q factor.

It is preferable that the electrode pattern 5*b* of the capacitor C is electrically coupled to the side portions of the outer electrode 4*b* with the two wiring patterns 51*a* and 51*b* arranged in line. It is also preferable that when viewed in plan view from one surface (top surface) of the major surfaces, a portion of the conductor patterns 1*a* and 1*b*, overlapping the capacitor C, extends parallel or substantially parallel to one specific edge of the insulator 3 near which the side portions of the outer electrode 4*b* face each other. It is also preferable that the wiring patterns 51*a* and 51*b* partially overlap the conductor patterns 1*a* and 1*b* when viewed in plan view from one surface (top surface) of the major surfaces. This configuration facilitates adjustments in filter design of the filter device 100.

The side portions of the outer electrode 4*b* can have the same potential. Consequently, the parasitic inductances ESL1 and ESL2 are generated in the parallel-coupled wiring patterns 51*a* and 51*b*.

The inductor L and the capacitor C define an LC series circuit. As a result, the filter device 100 includes an LC series circuit. Series resonant frequencies can be used as the pass bands of filters using LC series circuits. The resonant frequencies may shift due to parasitic inductance, which can lead to deterioration in performance as band pass filters. Thus, it is important to reduce or prevent variations in parasitic inductance due to the wiring patterns of the capacitor C, especially in LC series circuits.

Second Example Embodiment

In the first example embodiment, the filter device 100 has been described as a rectangular or substantially rectangular parallelepiped chip component that has the inductor L and the capacitor C stacked in the Z direction. In a second example embodiment, a filter device additionally including an inductor will be described.

Architecture of Filter Device

Figure 8:
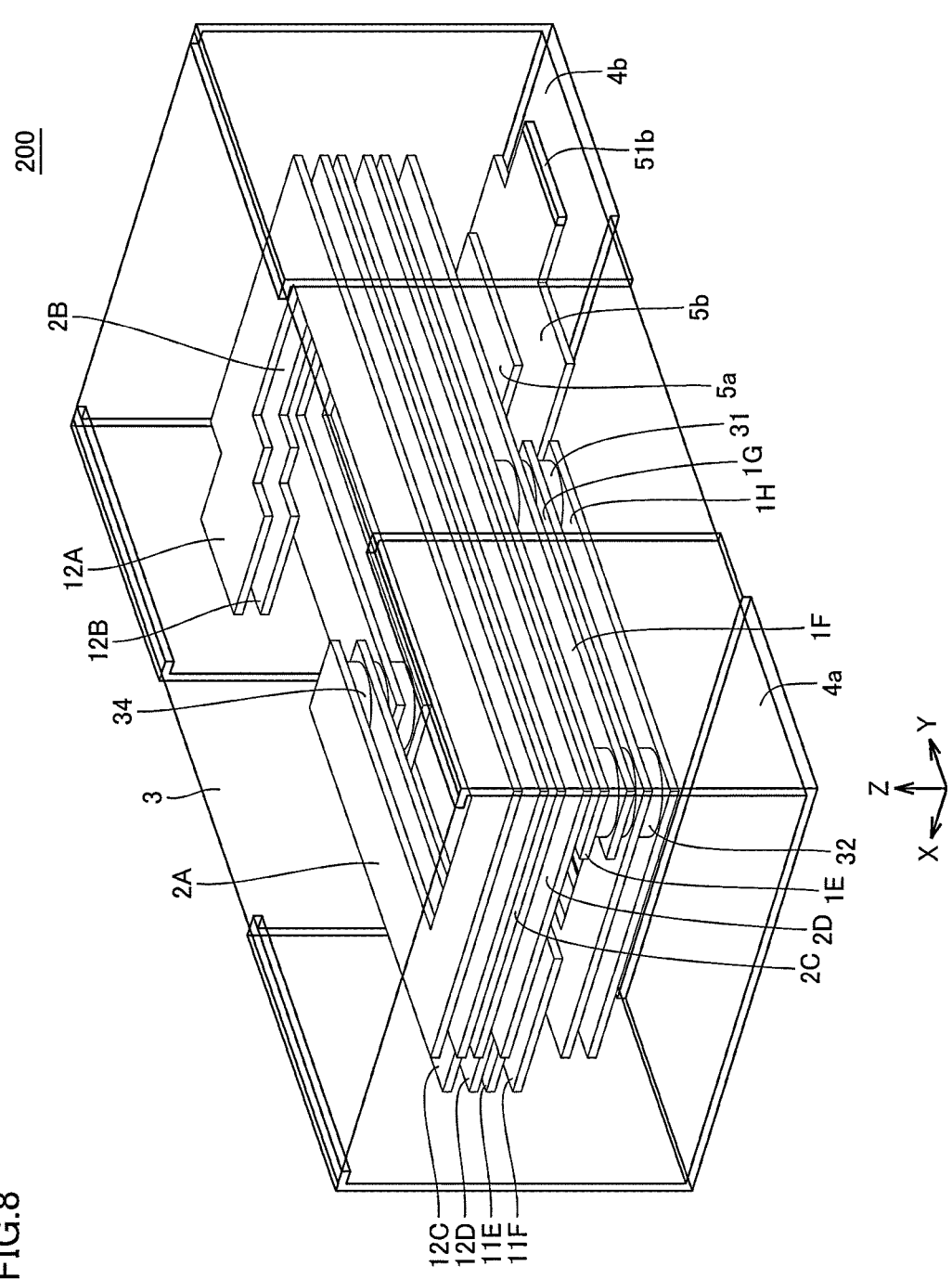
FIG. 8 is a perspective view of a filter device according to a second example embodiment of the present invention.

First, a filter device 200 according to the second example embodiment will be described with reference to the drawings. FIG. 8 is a perspective view of a filter device 200 according to the second example embodiment. In FIG. 8, the short-edge direction of the filter device 200 corresponds to the X direction, the long-edge direction to the Y direction, and the height direction to the Z direction. In the filter device 200 illustrated in FIG. 8, identical configuration elements to the filter device 100 illustrated in FIG. 1 are denoted by the same reference numerals, and detailed descriptions thereof will not be repeated.

The filter device 200 is a rectangular or substantially rectangular parallelepiped chip component that includes two inductors and one capacitor stacked in the Z direction. The filter device 200 includes a pair of opposite major surfaces. The major surface on the lower side in FIG. 8 serves as a mounting surface, which is designed to face a circuit board. In the second example embodiment, the major surface on the lower side in FIG. 8 is also referred to as the bottom surface, and the major surface on the upper side in FIG. 8 is also referred to as the top surface.

The filter device 200 includes an insulator 3 including multiple stacked insulating substrates (insulator layers) including first conductor patterns of a first inductor L1, second conductor patterns of a second inductor L2, and electrode patterns of a capacitor C, as illustrated in FIG. 8. The stacking direction of the insulating substrates corresponds to the Z direction, and the arrow of the Z direction indicates the direction towards the upper layers. In the filter device 200, the capacitor C, the first inductor L1, and the second inductor L2 are stacked in this order in the Z direction.

In the filter device 200, an outer electrode 4a (first outer electrode) and an outer electrode 4b (second outer electrode) are provided at two locations in the Y direction in the insulator 3 as illustrated in FIG. 8. First conductor patterns 1E and 1F of the first inductor L1 and the outer electrode 4a are electrically coupled at a side surface of the insulator 3 via wiring patterns 11E and 11F. Similarly, second conductor patterns 2A and 2B of the second inductor L2 and the outer electrode 4b are electrically coupled at a side surface of the insulator 3 via wiring patterns 12A and 12B. Second conductor patterns 2C and 2D of the second inductor L2 and the outer electrode 4a are electrically coupled at a side surface of the insulator 3 via wiring patterns 12C and 12D. An electrode pattern 5b (second electrode pattern) of the capacitor C and the outer electrode 4b are electrically coupled at specific side surfaces of the insulator 3 via a wiring pattern 51a (see FIG. 10) and a wiring pattern 51b.

The first inductor L1 includes first conductor patterns 1E to 1H stacked parallel or substantially parallel to the major surfaces of the insulator 3. The first conductor patterns 1E to 1H are electrically coupled via interconnections such as via-conductors 31 and 32. The second inductor L2 includes second conductor patterns 2A to 2D stacked parallel or substantially parallel to the major surfaces of the insulator 3. The second conductor patterns 2A to 2D are electrically coupled via a via-conductor 34. The capacitor C includes electrode patterns 5a and 5b stacked across layers under the first inductor L1, with an insulating layer interposed between the electrode patterns 5a and 5b. When viewed in plan view from one surface (top surface) of the major surfaces, the capacitor C is provided at a location that overlaps a portion of the first conductor patterns 1G and 1H in the insulator 3. The filter device 200 includes a circuit in which the first inductor L1 and the capacitor C are coupled in series, and the second inductor L2 is coupled in parallel with respect to the first inductor L1 and the capacitor C within the insulator 3.

Figure 9:
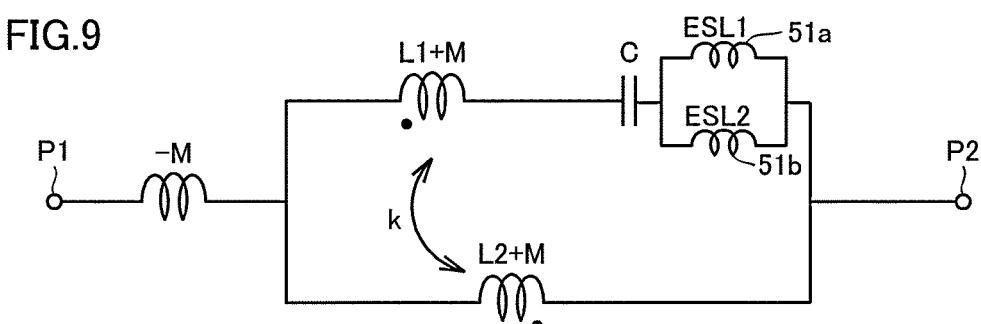
FIG. 9 is a circuit diagram of the filter device according to the second example embodiment of the present invention.

FIG. 9 is a circuit diagram of the filter device 200 according to the second example embodiment. The filter device 200 includes a first terminal P1, the first inductor L1 coupled to the first terminal P1, the capacitor C coupled in series with the first inductor L1, and a second terminal P2 coupled to the capacitor C. The filter device 200 includes the second inductor L2 coupled in parallel with respect to the first inductor L1 and the capacitor C, which are coupled in series. The first inductor L1 and the second inductor L2 can be magnetically coupled (coupling coefficient k). As a result, a mutual inductance M can be generated between the first inductor L1 and the second inductor L2. Considering the generated mutual inductance M, FIG. 9 provides an equivalent circuit in which the mutual inductance +M is additionally indicated with the first inductor L1 and the second inductor L2, and the mutual inductance −M is additionally indicated with the first terminal P1. The filter device 200 is not necessarily configured such that the first inductor L1 and the second inductor L2 can be magnetically coupled to each other. The filter device 200 may be configured such that the first inductor L1 and the second inductor L2 cannot be magnetically coupled to each other.

The first terminal P1 corresponds to the outer electrode 4a illustrated in FIG. 8, and the second terminal P2 corresponds to the outer electrode 4b illustrated in FIG. 8. In the circuit diagram of the filter device 200 illustrated in FIG. 9, parasitic inductances ESL1 and ESL2 are illustrated between the capacitor C and the second terminal P2. The parasitic inductances ESL1 and ESL2 can be generated in the wiring patterns 51a and 51b that connect the electrode pattern 5b of the capacitor C and the outer electrodes 4b.

Exploded Plan View of Filter Device

Figure 10:
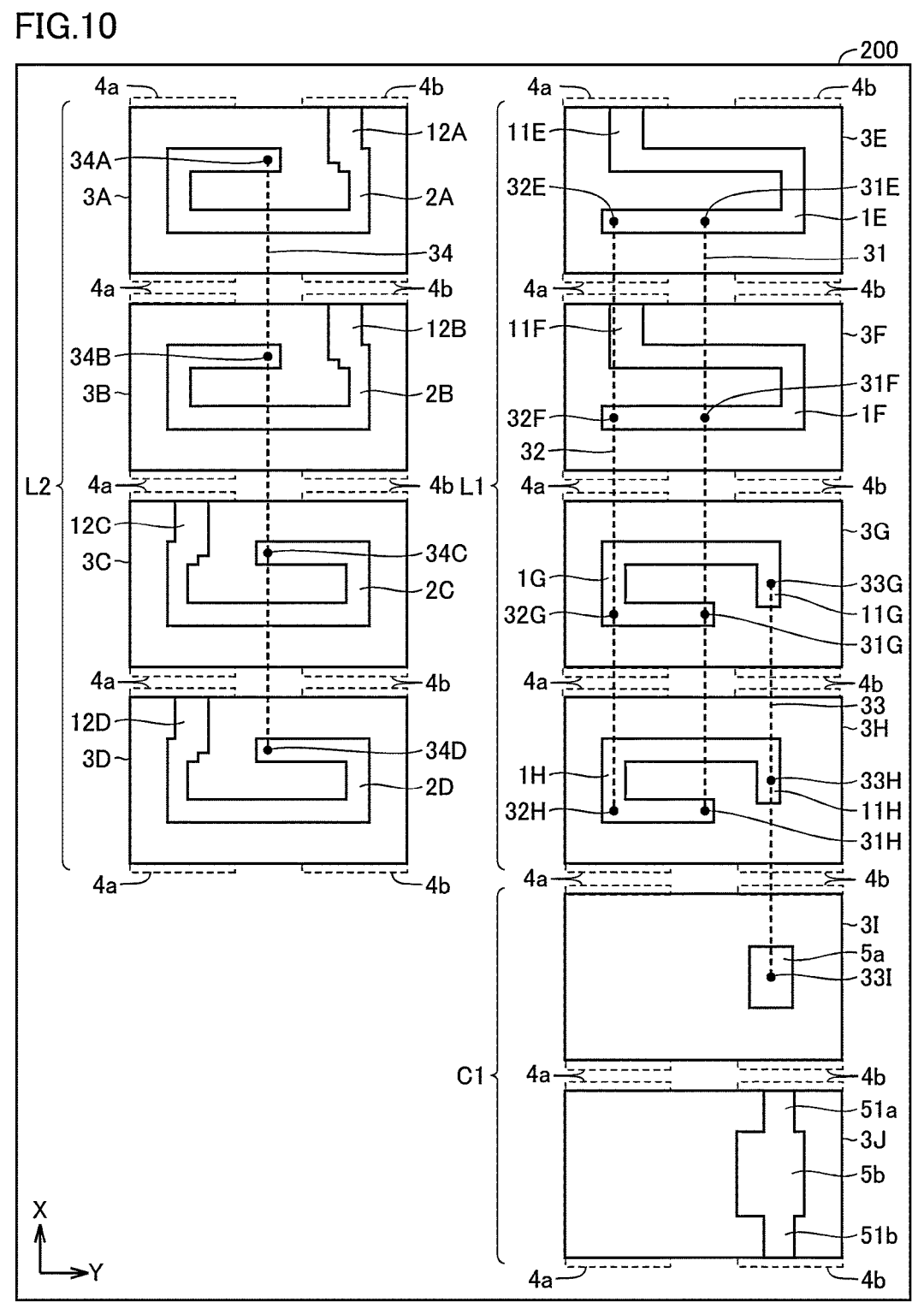

Next, the configuration of each layer will be described using an exploded plan view. FIG. 10 is an exploded plan view of a configuration of the filter device 200 according to the second example embodiment. First, as illustrated in FIG. 10, the first conductor patterns 1E to 1H, the second conductor patterns 2A to 2D, the wiring patterns 12A to 12D, 11E, 11F, 51a, and 51b, and the electrode patterns 5a and 5b are formed by printing on insulating substrates 3A to 3J.

The second conductor pattern 2A, which defines a portion of the second inductor L2, is provided on the insulating substrate 3A. The second conductor pattern 2A is shaped into approximately one clockwise turn starting from the upper right side of the insulating substrate 3A in the drawing. The starting end of the second conductor pattern 2A is electrically coupled to the outer electrode 4b via the wiring pattern 12A. Near the terminating end of the second conductor pattern 2A, a connection portion 34A is provided. The connection portion 34A is coupled to the via-conductor 34.

The second conductor pattern 2B, which defines a portion of the second inductor L2, is provided on the insulating substrate 3B. The second conductor pattern 2B is shaped into approximately one clockwise turn starting from the upper right side of the insulating substrate 3B in the drawing. The starting end of the second conductor pattern 2B is electrically coupled to the outer electrode 4b via the wiring pattern 12B. At the terminating end of the second conductor pattern 2B, a connection portion 34B is provided. The connection portion 34B is coupled to the via-conductor 34.

The second conductor pattern 2C, which defines a portion of the second inductor L2, is provided on the insulating substrate 3C. The second conductor pattern 2C is shaped into approximately one clockwise turn starting from the upper side of the insulating substrate 3C in the drawing. At the starting end of the second conductor pattern 2C, a connection portion 34C is provided. The connection portion 34B is coupled to the via-conductor 34. The terminating end of the second conductor pattern 2C is electrically coupled to the outer electrode 4a via the wiring pattern 12C.

The second conductor pattern 2D, which defines a portion of the second inductor L2, is provided on the insulating substrate 3D. The second conductor pattern 2D is shaped into approximately one clockwise turn starting from the upper side of the insulating substrate 3D in the drawing. At the starting end of the second conductor pattern 2D, a connection portion 34D is provided. The connection portion 34D is coupled to the via-conductor 34. The terminating end of the second conductor pattern 2D is electrically coupled to the outer electrode 4a via the wiring pattern 12D.

The second inductor L2 is shaped into an approximately two-turn coil. The approximately two-turn coil includes first coupling the second conductor patterns 2A and 2B in parallel, also coupling the second conductor patterns 2C and 2D in parallel, and further coupling the parallel-coupled second conductor patterns 2A and 2B and the parallel-coupled second conductor patterns 2C and 2D in series.

The first conductor pattern 1E, which defines a portion of the first inductor L1, is provided on the insulating substrate 3E. The first conductor pattern 1E is shaped into an approximately ¾ clockwise turn starting from the upper left side of the insulating substrate 3E in the drawing. The starting end of the first conductor pattern 1E is electrically coupled to the outer electrode 4a via the wiring pattern 11E. Near the terminating end of the first conductor pattern 1E, connection portions 31E and 32E are provided. The connection portion 31E is coupled to the via-conductor 31, and the connection portion 32E is coupled to the via-conductor 32.

The first conductor pattern 1F, which defines a portion of the first inductor L1, is provided on the insulating substrate 3F. The first conductor pattern 1F is shaped into an approximately ¾ clockwise turn starting from the upper left side of the insulating substrate 3F in the drawing. The starting end of the first conductor pattern 1F is electrically coupled to the outer electrode 4a via the wiring pattern 11F. Near the terminating end of the first conductor pattern 1F, connection portions 31F and 32F are provided. The connection portion 31F is coupled to the via-conductor 31, and the connection portion 32F is coupled to the via-conductor 32.

The first conductor pattern 1G, which defines a portion of the first inductor L1, is provided on the insulating substrate 3G. The first conductor pattern 1G is shaped into an approximately ¾ clockwise turn starting from the lower side of the insulating substrate 3G in the drawing. Near the starting end of the first conductor pattern 1G, connection portions 31G and 32G are provided. The connection portion 31G is coupled to the via-conductor 31, and the connection portion 32G is coupled to the via-conductor 32. Near the terminating end of the first conductor pattern 1G, a connection portion 33G is provided. The connection portion 33G is coupled to the via-conductor 33.

The first conductor pattern 1H, which defines a portion of the first inductor L1, is provided on the insulating substrate 3H. The first conductor pattern 1H is shaped into an approximately ¾ clockwise turn starting from the lower side of the insulating substrate 3H in the drawing. Near the starting end of the first conductor pattern 1H, connection portions 31H and 32H are provided. The connection portion 31H is coupled to the via-conductor 31, and the connection portion 32H is coupled to the via-conductor 32. Near the terminating end of the first conductor pattern 1H, a connection portion 33H is provided. The connection portion 33H is coupled to the via-conductor 33.

The first inductor L1 is shaped into an approximately 1.5-turn coil. The approximately 1.5-turn coil includes first coupling the first conductor patterns 1E and 1F in parallel, also coupling the first conductor patterns 1G and 1H in parallel, and further coupling the parallel-coupled first conductor patterns 1E and 1F and the parallel-coupled first conductor patterns 1G and 1H in series.

The electrode pattern 5a (first electrode pattern), which defines one electrode of the capacitor C, is provided on the insulating substrate 3I. When viewed in plan view from the top surface, the electrode pattern 5a is provided at a location that overlaps a portion of the first conductor patterns 1G and 1H in the insulator 3. In other words, the electrode pattern 5a is positioned to reduce or minimize overlap with the opening portion of the first inductor L1, which includes the first conductor patterns 1G and 1H. The electrode pattern 5a includes a connection portion 33I that is coupled to the via-conductor 33.

The electrode pattern 5b, which defines the other electrode of the capacitor C, is provided on the insulating substrate 3J. When viewed in plan view from the top surface, the electrode pattern 5b is provided at a location that faces the electrode pattern 5a in the insulator 3. The electrode pattern 5b is electrically coupled to the outer electrode 4b via the wiring patterns 51a and 51b. Although the wiring patterns 51a and 51b are each illustrated as a single wire, the wiring patterns 51a and 51b may each include multiple wires.

The outer electrode 4b is provided on specific opposite side surfaces of the insulator 3 as illustrated in FIG. 8. The wiring patterns 51a and 51b electrically couple the respective side portions of the outer electrode 4b to the electrode pattern 5b. The side portions of the outer electrode 4b is electrically coupled with the pattern on the bottom surface. As a result, the side portions of the outer electrode 4b have the same potential. In other words, the wiring patterns 51a and 51b are coupled in parallel between the second terminal P2 (the outer electrode 4b) and the capacitor C (the electrode pattern 5b) as illustrated in the circuit diagram in FIG. 9. Consequently, the parasitic inductances ESL1 and ESL2, generated by the wiring patterns 51a and 51b, are parallel or substantially parallel to each other, which actually decreases the parasitic inductance. The filter device 200 achieves the same effects as the filter device 100 described in the first example embodiment.

Next, a modification of the filter device 200 will be described in which the outer electrode shape is changed. The outer electrodes 4a and 4b illustrated in FIG. 8 are U-shaped or substantially U-shaped when the insulator 3 is viewed from a side surface (XZ plane) along a short edge of the insulator 3. No electrodes are provided on the side surfaces (XZ plane) along the short edges of the insulator 3. The outer electrode shape is not limited to this example. The outer electrodes may be dogbone-shaped or substantially dogbone-shaped, extending to cover the side surfaces (XZ plane) along the short edges of the insulator 3.

Figure 11:
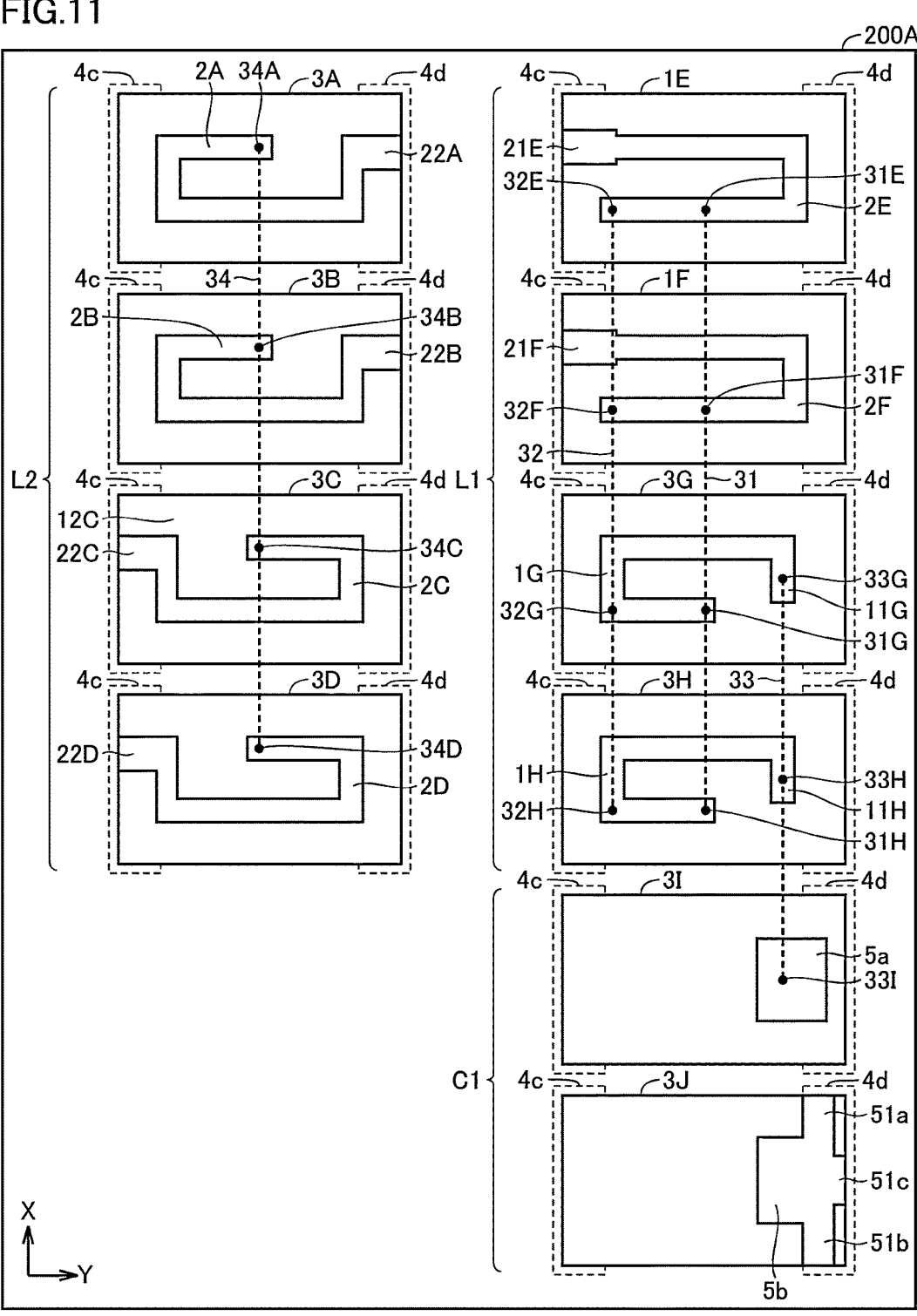
FIG. 11 is an exploded plan view of a configuration of a modification of the filter device according to the second example embodiment of the present invention.

FIG. 11 is an exploded plan view of a configuration of a modification of the filter device according to the second example embodiment. In a filter device 200A illustrated in FIG. 11, the outer electrodes 4c and 4d are dogbone-shaped. Wiring patterns 22A to 22D, 21E, and 21F are alternatively used to couple the outer electrodes 4c and 4d are coupled to the first conductor patterns 1E and 1F and the second conductor patterns 2A to 2D. FIG. 11 is identical to the exploded plan view illustrated in FIG. 10, with the exception that the outer electrodes 4c and 4d and the wiring patterns 22A to 22D, 21E, and 21F are changed. Thus, identical configuration elements are denoted by the same reference numerals, and detailed descriptions thereof are not repeated.

The second conductor pattern 2A on the insulating substrate 3A is electrically coupled to the outer electrode 4d via the wiring pattern 22A at the short edge of the insulating substrate 3A on the right side in the drawing. Similarly, the second conductor pattern 2B on the insulating substrate 3B is electrically coupled to the outer electrode 4d via the wiring pattern 22B at the short edge of the insulating substrate 3B on the right side in the drawing.

The second conductor pattern 2C on the insulating substrate 3C is electrically coupled to the outer electrode 4c via the wiring pattern 22C at the short edge of the insulating substrate 3C on the left side in the drawing. Similarly, the second conductor pattern 2D on the insulating substrate 3D is electrically coupled to the outer electrode 4c via the wiring pattern 22D at the short edge of the insulating substrate 3D on the left side in the drawing.

The first conductor pattern 1E on the insulating substrate 3E is electrically coupled to the outer electrode 4c via the wiring pattern 21E at the short edge of the insulating substrate 3E on the left side in the drawing. Similarly, the first conductor pattern 1F on the insulating substrate 3F is electrically coupled to the outer electrode 4c via the wiring pattern 21F at the short edge of the insulating substrate 3F on the left side in the drawing.

The first conductor pattern 1G on the insulating substrate 3G is electrically coupled to the first conductor patterns 1E and 1F via the via-conductors 31 and 32. Similarly, the first conductor pattern 1H on the insulating substrate 3H is electrically coupled to the first conductor patterns 1E, 1F, and 1G via the via-conductors 31 and 32.

The electrode pattern 5a (first electrode pattern) on the insulating substrate 3I defines one electrode of the capacitor C. The electrode pattern 5a has a connection portion 33I coupled to the via-conductor 33.

The electrode pattern 5b (second electrode pattern) on the insulating substrate 3J defines the other electrode of the capacitor C. The electrode pattern 5b is electrically coupled to the outer electrode 4d at specific opposite side surfaces, parallel or substantially parallel to a portion of the first conductor patterns 1G and 1H. A wiring pattern 51c may be coupled to the outer electrode 4d in a direction different from the wiring patterns 51a and 51b.

The dogbone-shaped outer electrodes 4c and 4d described with the filter device 200A may be applied in the same manner to the filter devices 100, 100A, and 100B according to the first example embodiment.

As described above, the filter device 200 according to the second example embodiment further includes the second inductor L2 including at least one second conductor pattern within the insulator 3. With this configuration, a filter device including two inductors and one capacitor within the insulator 3 can be realized. In this filter device, reducing or minimizing the variation in parasitic inductance in the wiring patterns of the capacitor decreases the variation in the LC series resonant frequency, thus ensuring an adequate bandpass characteristic as a filter device. Additionally, simultaneously reducing the variation in the LC parallel resonant frequency achieves an adequate filter-device attenuation characteristic.

It is preferable that the second inductor L2 is coupled in parallel with respect to the first inductor L1. It is also preferable that the second inductor L2 is magnetically coupled to the first inductor L1. An exemplary configuration of the filter device 200A with the conductor patterns coupled in parallel every two layers has been described. However, the conductor patterns may be used in every one layer, or the conductor patterns may be coupled in parallel every three or more layers.

Figure 12:
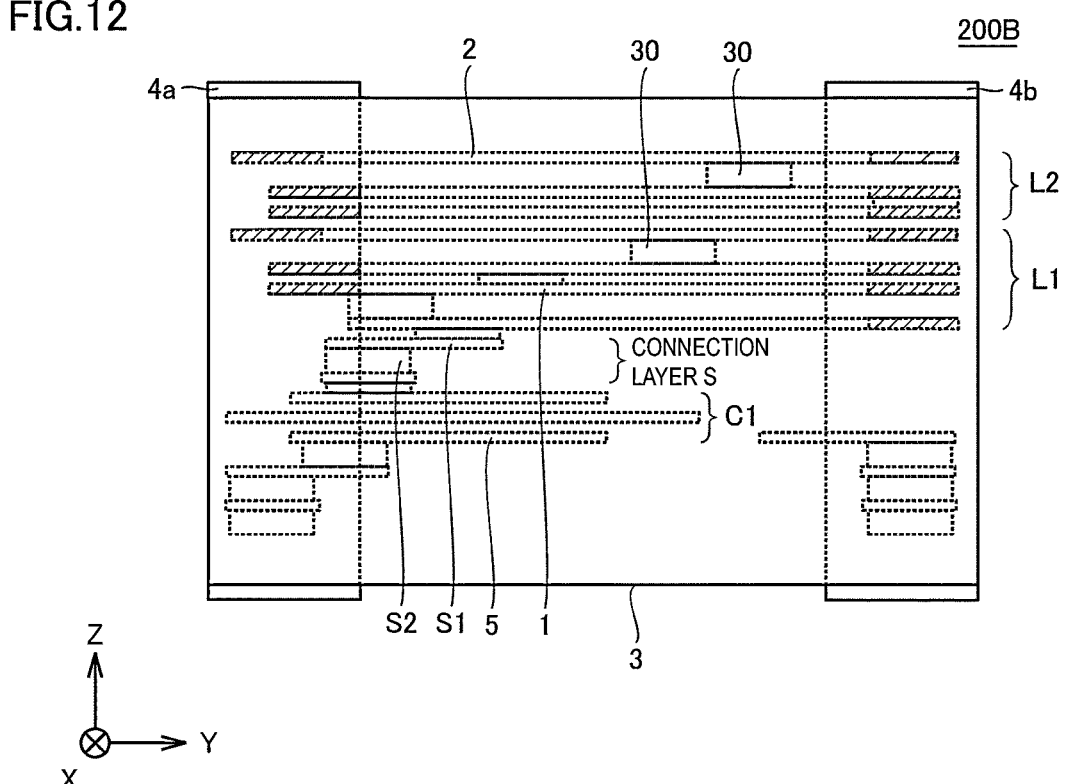
FIG. 12 is a sectional view of a configuration of another modification of the filter device according to the second example embodiment of the present invention.

Referring to FIG. 10, the filter device 200 that functions as a band pass filter to pass signals in the 5 GHz Wi-Fi (registered trademark) band and block signals in the fifth generation n78 (3.7 GHz band) and n79 (4.5 GHz band), for example, has been described. In the following modifications, filter devices that functions as band pass filters to pass signals in the 2.4 GHZ Wi-Fi (registered trademark) band and block signals in the GPS band (1.1-1.6 GHZ) will be described. FIG. 12 is a sectional view of a configuration of another modification of the filter device according to the second example embodiment. In a filter device 200B illustrated in FIG. 12, a capacitor C1, a first inductor L1, and a second inductor L2 are stacked in the Z direction in this order, and the first inductor L1 and the second inductor L2 can be magnetically coupled.

Specifically, the second inductor L2 includes three second conductor patterns 2 stacked parallel or substantially parallel to the major surfaces of the insulator 3. The second conductor patterns 2 are electrically coupled via a via-conductor 30. The first inductor L1 includes four first conductor patterns 1 stacked parallel or substantially parallel to the major surfaces of the insulator 3. The first conductor patterns 1 are electrically coupled via a via-conductor 30. The capacitor C1 includes electrode patterns 5 stacked across layers under the first inductor L1, with an insulating layer interposed between the electrode patterns 5.

Because the filter device 200B illustrated in FIG. 12 manages signals in a lower frequency band compared to the filter device 200 illustrated in FIG. 10, the capacitor C1 is relatively larger. As the size of the capacitor C1 increases, the area of the electrode patterns 5 expands. As a result, when viewed in plan view from the top surface, more than half of the electrode pattern 5 overlaps the openings of the first inductor L1 and the second inductor L2. Thus, in the filter device 200B, a connection layer S is provided between the first inductor L1 and the capacitor C1 to maintain an adequate distance in the stacking direction between the first inductor L1 and the capacitor C1. For example, the distance in the stacking direction between the first inductor L1 and the capacitor C1 is made longer than the distance in the stacking direction between the first inductor L1 and the second inductor L2. The connection layer S includes multiple conductive patterns S1 and a via-conductor S2. Incorporating the connection layer S enhances the spread of magnetic fields generated by the first inductor L1 and the second inductor L2, thus reducing or minimizing the decrease in inductance and the deterioration of Q factors. The first inductor L1 and the second inductor L2 may be stacked in reverse order in the filter device 200B. The configuration of the connection layer S may be applied to other example embodiments.

Modifications

The conductive patterns of the inductor L, the first inductor L1, and the second inductors L2 described above have rectangular or substantially rectangular shapes. When implemented as small components, filter devices use rectangular or substantially rectangular conductor patterns to increase or maximize inductance by extending the conductor patterns to the outer frame of the insulator 3 to the maximum possible extent. However, the shape of conductive patterns is not limited to rectangles; the shape of conductive patterns may be polygonal shapes such as octagons or curved shapes such as ellipses.

Figure 13:
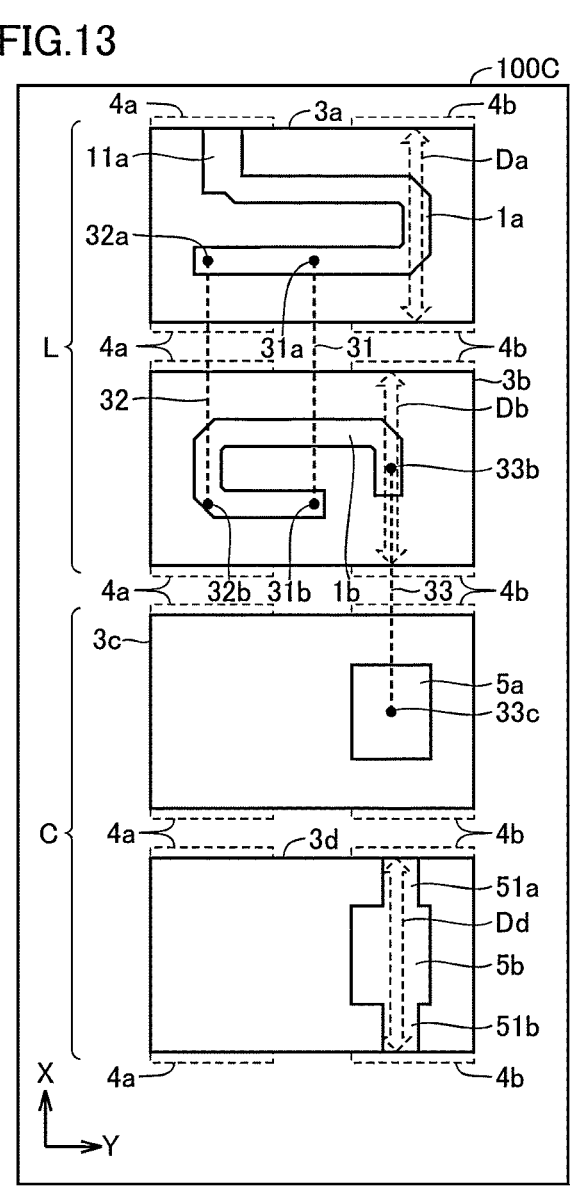
FIG. 13 is an exploded plan view of a configuration of a filter device according to a first modification of an example embodiment of the present invention.

FIG. 13 is an exploded plan view of a configuration of a filter device 100C according to a first modification according to an example embodiment of the present invention. The filter device 100C is a rectangular or substantially rectangular parallelepiped chip component that has one inductor and one capacitor stacked in the Z direction. The filter device 100C includes an insulator 3 including multiple stacked insulating substrates 3a to 3d including the conductor patterns of an inductor L and the electrode patterns of a capacitor C, as illustrated in FIG. 13. In FIG. 13, identical configuration elements to the configuration elements in the exploded plan view illustrated in FIG. 3 are denoted by the same reference numerals, and detailed descriptions thereof will not be repeated.

A conductor pattern 1a, which defines a portion of the inductor L, is provided on the insulating substrate 3a. The conductor pattern 1a is not rectangular or substantially rectangular but octagonal. The portion overlapping the capacitor C of the conductor pattern 1a partially parallel or substantially parallel to one specific edge (short edge) of the insulator 3. Near the one specific edge, the side portions of the outer electrode 4b face each other. Thus, as illustrated in FIG. 13, a direction Da along a portion of the conductor pattern 1a runs parallel or substantially parallel to a wiring direction Dd of wiring patterns 51a and 51b on the insulating substrate 3d.

A conductor pattern 1b, which defines a portion of the inductor L, is provided on the insulating substrate 3b. The conductor pattern 1b is not rectangular or substantially rectangular but octagonal. The portion overlapping the capacitor C of the conductor pattern 1b partially extends parallel or substantially parallel to one specific edge (short edge) of the insulator 3. Near the one specific edge, the side portions of the outer electrode 4b face each other. Thus, as illustrated in FIG. 13, a direction Db along a portion of the conductor pattern 1b runs parallel or substantially parallel to the wiring direction Dd of the wiring patterns 51a and 51b on the insulating substrate 3d.

Figure 14:
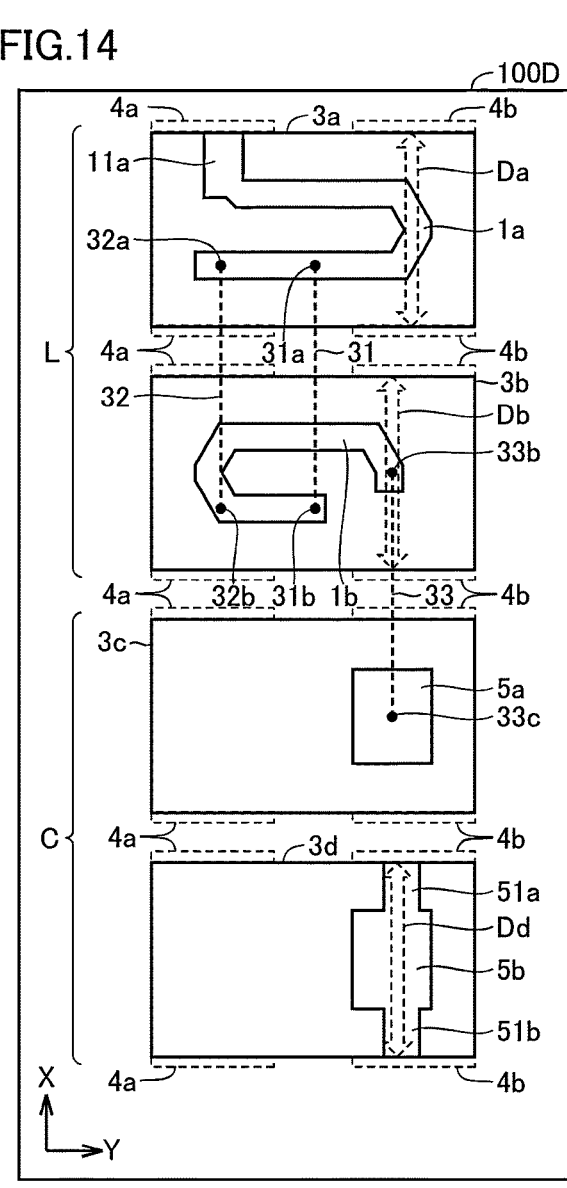
FIG. 14 is an exploded plan view of a configuration of a filter device according to a second modification of an example embodiment of the present invention.

Next, FIG. 14 is an exploded plan view of a configuration of a filter device 100D according to a second modification according to an example embodiment of the present invention. The filter device 100D is a rectangular or substantially rectangular parallelepiped chip component that includes one inductor and one capacitor stacked in the Z direction. The filter device 100D includes an insulator 3 including multiple stacked insulating substrates 3a to 3d having the conductor patterns of an inductor L and the electrode patterns of a capacitor C, as illustrated in FIG. 14. In FIG. 14, identical configuration elements to the configuration elements in the exploded plan view illustrated in FIG. 3 are denoted by the same reference numerals, and detailed descriptions thereof will not be repeated.

A conductor pattern 1a, which defines a portion of the inductor L, is provided on the insulating substrate 3a. The conductor pattern 1a is not rectangular or substantially rectangular but hexagonal. The portion overlapping the capacitor C of the conductor pattern 1a partially extends parallel or substantially parallel to one specific edge (short edge) of the insulator 3. Near the one specific edge, the side portions of the outer electrode 4b face each other. Thus, as illustrated in FIG. 14, a direction Da along a portion of the conductor pattern 1a runs parallel or substantially parallel to a wiring direction Dd of wiring patterns 51a and 51b on the insulating substrate 3d.

A conductor pattern 1b, which defines a portion of the inductor L, is provided on the insulating substrate 3b. The conductor pattern 1b is not rectangular or substantially rectangular but hexagonal. The portion overlapping the capacitor C of the conductor pattern 1b partially extends parallel or substantially parallel to one specific edge (short edge) of the insulator 3. Near the one specific edge, the side portions of the outer electrode 4b face each other. Thus, as illustrated in FIG. 14, a direction Db along a portion of the conductor pattern 1b runs parallel or substantially parallel to the wiring direction Dd of the wiring patterns 51a and 51b on the insulating substrate 3d.

Figure 15:
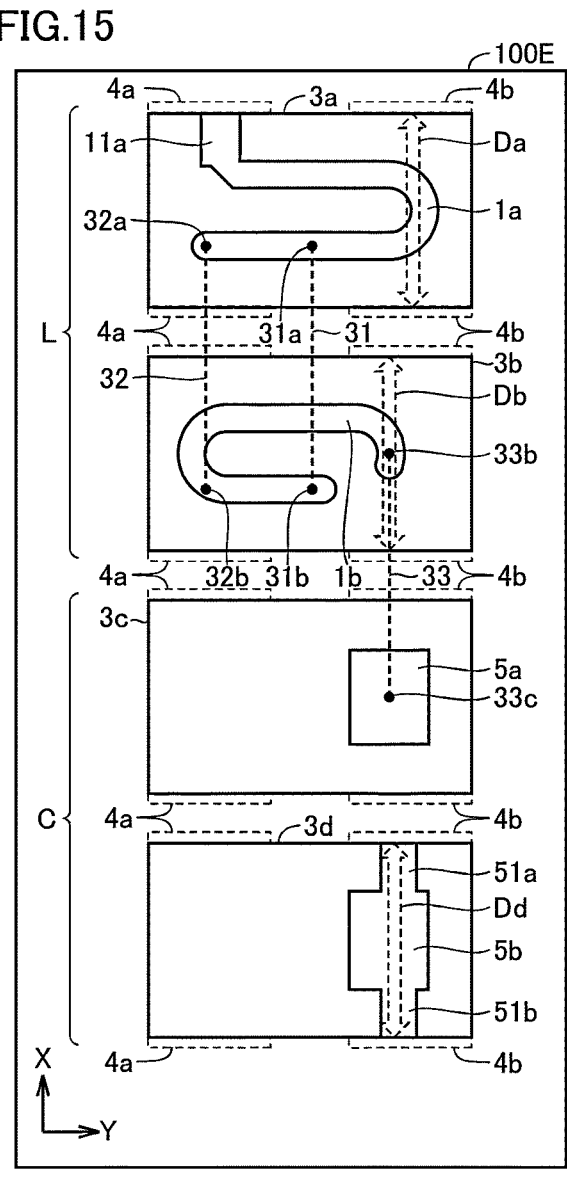
FIG. 15 is an exploded plan view of a configuration of a filter device according to a third modification of an example embodiment of the present invention.

Further, FIG. 15 is an exploded plan view of a configuration of a filter device 100E according to a third modification. The filter device 100E is a rectangular or substantially rectangular parallelepiped chip component that has one inductor and one capacitor stacked in the Z direction. The filter device 100E includes an insulator 3 including multiple stacked insulating substrates 3a to 3d having the conductor patterns of an inductor L and the electrode patterns of a capacitor C, as illustrated in FIG. 14. In FIG. 15, identical configuration elements to the configuration elements in the exploded plan view illustrated in FIG. 3 are denoted by the same reference numerals, and detailed descriptions thereof will not be repeated.

A conductor pattern 1a, which defines a portion of the inductor L, is provided on the insulating substrate 3a. The conductor pattern 1a is not rectangular or substantially rectangular but elliptical. The portion overlapping the capacitor C of the conductor pattern 1a partially extends parallel or substantially parallel to one specific edge (short edge) of the insulator 3. Near the one specific edge, the side portions of the outer electrode 4b face each other. Thus, as illustrated in FIG. 15, a direction Da along a portion of the conductor pattern 1a runs parallel or substantially parallel to a wiring direction Dd of wiring patterns 51a and 51b on the insulating substrate 3d.

A conductor pattern 1b, which defines a portion of the inductor L, is provided on the insulating substrate 3b. The conductor pattern 1b is not rectangular or substantially rectangular but elliptical. The portion overlapping the capacitor C of the conductor pattern 1b partially extends parallel or substantially parallel to one specific edge (short edge) of the insulator 3. Near the one specific edge, the side portions of the outer electrode 4b face each other. Thus, as illustrated in FIG. 15, a direction Db along a portion of the conductor pattern 1b runs parallel or substantially parallel to the wiring direction Dd of the wiring patterns 51a and 51b on the insulating substrate 3d.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electronic component comprising:
an insulator including a pair of opposite major surfaces and side surfaces;
a first inductor including at least one first conductor pattern within the insulator;
a capacitor overlapping a portion of the at least one first conductor pattern in the insulator when viewed in plan view from one of the major surfaces;
a second inductor including at least one second conductor pattern within the insulator;

a first outer electrode electrically coupled to the first inductor; and a second outer electrode electrically coupled to the capacitor, the second outer electrode including side portions provided on specific opposite side surfaces among the side surfaces of the insulator; wherein the capacitor includes:

a first electrode pattern electrically coupled to the first inductor; and a second electrode pattern electrically coupled to the side portions of the second outer electrode with at least one wiring pattern;

the at least one wiring pattern is parallel or substantially parallel to a portion of the at least one first conductor pattern;

the second inductor is coupled in parallel with respect to the first inductor; and the second inductor is magnetically coupled to the first inductor.

2. The electronic component according to claim 1, wherein the at least one wiring pattern includes two wiring patterns arranged in a line, and the second electrode pattern of the capacitor is electrically coupled to the side portions of the second outer electrode with the two wiring patterns.

3. The electronic component according to claim 1, wherein when viewed in plan view from one surface of the major surfaces, a portion overlapping the capacitor of the at least one first conductor pattern is parallel or substantially parallel to one edge of the insulator, and the side portions of the second outer electrode face each other at or adjacent to the one edge of the insulator.

4. The electronic component according to claim 1, wherein the wiring pattern partially overlaps the at least one first conductor pattern when viewed in plan view from one of the major surfaces.

5. The electronic component according to claim 1, wherein the side portions of the second outer electrode have a same potential.

6. The electronic component according to claim 1, wherein the first inductor and the capacitor define an LC series circuit.

7. The electronic component according to claim 1, wherein the capacitor, the first inductor, and the second inductor are stacked vertically relative to the major surfaces in order.

8. The electronic component according to claim 1, wherein the opposite side surfaces including the side portions of the second outer electrode correspond to a first side surface and a second side surface among the side surfaces, and the second outer electrode includes another side portion on a third side surface between the first side surface and the second side surface among the side surfaces; and the at least one wiring pattern includes two or more wiring patterns, and one of the two or more wiring patterns is electrically coupled to the side portion on the third side surface of the second outer electrode.

9. The electronic component according to claim 7, wherein a distance in a stacking direction between the capacitor and the first inductor is longer than a distance in the stacking direction between the first inductor and the second inductor.

10. The electronic component according to claim 1, wherein the electronic component is a filter.

11. The electronic component according to claim 1, wherein the electronic component is a rectangular or substantially rectangular parallelepiped chip component.

12. The electronic component according to claim 1, wherein parasitic inductances are between the capacitor and the second outer electrode.

13. The electronic component according to claim 1, wherein the at least one first conductor pattern includes an approximately ¾ turn.

14. The electronic component according to claim 1, wherein the at least one second conductor pattern includes an approximately ¾ turn.

15. The electronic component according to claim 1, wherein the insulator includes a plurality of insulator layers and conductor patterns stacked on each other with a misalignment among the conductor patterns.

16. The electronic component according to claim 1, wherein the first outer electrode and the second outer electrode are U-shaped or substantially U-shaped.

17. The electronic component according to claim 1, the first outer electrode and the second outer electrode are dogbone-shaped or substantially dogbone-shaped.

* * * * *